(12) United States Patent  
Idehara et al.

(10) Patent No.: US 10,680,849 B2  
(45) Date of Patent: Jun. 9, 2020

(54) BUILT-IN APPARATUS, COMMUNICATION METHOD, AND COMPUTER READABLE MEDIUM

(71) Applicant: MITSUBISHI ELECTRIC CORPORATION, Tokyo (JP)

(72) Inventors: Akio Idehara, Tokyo (JP); Tomohisa Yamaguchi, Tokyo (JP); Hirotaka Motai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/764,348

(22) PCT Filed: Nov. 24, 2015

(86) PCT No.: PCT/JP2015/082852  
§ 371 (c)(1),  
(2) Date: Mar. 29, 2018

(87) PCT Pub. No.: WO2017/090078  
PCT Pub. Date: Jun. 1, 2017

(65) Prior Publication Data  
US 2018/0270080 A1    Sep. 20, 2018

(51) Int. Cl.  
*H04L 12/403*   (2006.01)  
*H04L 1/00*   (2006.01)  
(Continued)

(52) U.S. Cl.  
CPC ........ *H04L 12/403* (2013.01); *G05B 19/4185* (2013.01); *G06F 11/1004* (2013.01);  
(Continued)

(58) Field of Classification Search  
None  
See application file for complete search history.

(56) References Cited

U.S. PATENT DOCUMENTS

| 6,483,846 B1 | 11/2002 | Huang et al. |
| 7,969,985 B1 * | 6/2011 | Cline .................. H04L 12/4035 370/394 |

(Continued)

FOREIGN PATENT DOCUMENTS

| JP | 60-218941 A | 11/1985 |
| JP | 2002-520950 A | 7/2002 |

(Continued)

OTHER PUBLICATIONS

International Search Report (PCT/ISA/210) issued in PCT/JP2015/082852, dated Jan. 12, 2016.

*Primary Examiner* — Henry Tsai  
*Assistant Examiner* — Christopher A Bartels  
(74) *Attorney, Agent, or Firm* — Birch, Stewart, Kolasch & Birch, LLP.

(57) ABSTRACT

A built-in apparatus includes a response time buffer (11) that stores a response time, a calculation result buffer (14) that stores a calculated frame, and a transmission part (130). The transmission part (130) obtains second data and start processing for calculating a frame check sequence from the second data, upon receiving a transmission command (310), judges whether frame transmission processing for generating and transmitting the second data and the frame check sequence calculated from the second data as a response frame (320) will be completed within the response time, and transmits the calculated frame stored in the calculation result buffer (14) as the response frame (320) when judging that the frame transmission processing will not be completed within the response time.

14 Claims, 11 Drawing Sheets

(51) Int. Cl.
  *H04L 29/08* (2006.01)
  *G05B 19/418* (2006.01)
  *G06F 11/10* (2006.01)
  *G06F 11/34* (2006.01)

(52) U.S. Cl.
  CPC ............ *G06F 11/3419* (2013.01); *H04L 1/00* (2013.01); *H04L 67/125* (2013.01); *H04L 69/324* (2013.01)

(56) References Cited

U.S. PATENT DOCUMENTS

| | | | |
|---|---|---|---|
| 9,312,974 B2 | 4/2016 | Ando | |
| 10,097,240 B2* | 10/2018 | Hansell | .................... H04B 3/54 |
| 2006/0129864 A1* | 6/2006 | Kynast | .................. H04J 3/0661 |
| | | | 713/375 |
| 2008/0209203 A1* | 8/2008 | Haneda | .................... G06F 21/72 |
| | | | 713/150 |
| 2012/0275501 A1* | 11/2012 | Rotenstein | ............ H04J 3/0667 |
| | | | 375/220 |
| 2013/0336340 A1 | 12/2013 | Ando | |
| 2014/0075235 A1* | 3/2014 | Chandhoke | ........... H04J 3/0667 |
| | | | 713/401 |
| 2016/0147579 A1* | 5/2016 | Decker | ................. G06F 9/4881 |
| | | | 718/102 |
| 2016/0154756 A1* | 6/2016 | Dodson | ............... G06F 13/4022 |
| | | | 710/316 |
| 2018/0089881 A1* | 3/2018 | Johnson | .............. G06F 9/45558 |

FOREIGN PATENT DOCUMENTS

| | | |
|---|---|---|
| JP | 2005-94251 A | 4/2005 |
| JP | 2008-53911 A | 3/2006 |
| JP | 2011-182476 A | 9/2011 |
| WO | WO 2012/114517 A1 | 8/2012 |

\* cited by examiner

BUILT-IN APPARATUS, COMMUNICATION METHOD, AND COMPUTER READABLE MEDIUM

TECHNICAL FIELD

The present invention relates to a built-in apparatus that may be assembled in a slave station, and a communication method and a communication program therefor.

BACKGROUND ART

Recent factory automation (FA) systems use an industrial field network (IFNW) of Ethernet (registered trademark) between FA controllers and between an FA controller and an I/O. Hereinafter, the FA controller is called a "master station", and the I/O is called a "slave station".

In a case in which a master station controls multiple slave stations, devices are connected to each other in a line type network topology for saving wires. Such an industrial field network performs transmission and reception of frames using token frames in accordance with the type of protocol.

A system such as a servo system may be required to have synchronization characteristic and real-time responsiveness. In this system, a processing time from when a slave station receives a token frame addressed to its own station until when the slave station transmits a token frame to the next station is reduced to shorten the tact time, thereby improving the productivity per unit time.

Thus, in a case of protocol using token frames, the time from when a station receives a token frame addressed to its own station until when the station transmits a token frame to the next station is important.

After receiving a token frame, a typical slave station in such a system adds a frame check sequence (FCS) to the token frame to generate a dedicated frame by using dedicated hardware such as an application specific integrated circuit (ASIC). The slave station transmits its own data in the generated dedicated frame and immediately transmits a token frame to the next station. This processing is executed independently of software processing. Thus, using dedicated hardware enables generation of a dedicated frame independently of software, thereby allowing a constructing an FA system that has superior synchronization characteristic and high real-time responsiveness.

An IFNW that allows constructing such a highly precise FA system having superior synchronization characteristic and high real-time responsiveness is disclosed in PTL 1.

CITATION LIST

Patent Literature

PTL 1: WO2012/114517

SUMMARY OF INVENTION

Technical Problem

PTL 1 discloses a technique requiring dedicated hardware, which can increase the product cost of a slave station. In addition, the hardware executes only protocol processing, and adding an additional function at a later time is difficult. For these reasons, there is a need to process a protocol by software instead of dedicated hardware. In this case, to generate a frame by a software protocol stack, processing relating to generation of the frame, such as addition of a frame check sequence, must be performed by software.

Problems that tend to occur in adding a frame check sequence by software are described as follows. The frame check sequence is also called a "frame check byte". A cyclic redundancy check (CRC) is commonly used for the frame check sequence. A frame check sequence of an Ethernet (registered trademark) frame is normally added by a general purpose LAN controller, thereby eliminating the need for software to add it. However, in accordance with some protocol specifications, frame check data must be added in a field other than a frame check sequence of the Ethernet (registered trademark) frame. To calculate a CRC for adding frame check data to transmission data in accordance with such a protocol, the algorithm of the CRC requires reading all of the data to be transmitted from its own station. However, most hardware used at a slave station has a low CPU performance or a low I/O performance, and therefore, the slave station tends to require a great deal of time to read its own transmission frame in memory, resulting in increase in time from when the slave station receives a token frame addressed to its own station until when the slave station transmits its own data. Thus, when there is a software slave station, the synchronization characteristic and the real-time responsiveness of the system as a whole are degraded even if other slave stations are constructed of hardware.

An object of the invention is to enable transmitting a correct frame within a response time not to affect periodicity of other hardware slave station even when it is judged that frame transmission processing will not be completed within a response time.

Solution to Problem

A built-in apparatus according to the present invention includes:

a response time buffer to store a response time from when a transmission command for transmitting a response frame is received until when the transmission of the response frame is completed;

a calculation result buffer to store first data and a frame check sequence that is calculated from the first data, as a calculated frame; and a transmission part to obtain second data and start processing for calculating a frame check sequence from the second data, upon receiving the transmission command, judge whether frame transmission processing for generating and transmitting the second data and the frame check sequence calculated from the second data as the response frame will be completed within the response time, and transmit the calculated frame stored in the calculation result buffer as the response frame when judging that the frame transmission processing will not be completed within the response time.

Advantageous Effects of Invention

The built-in apparatus of the invention includes the calculation result buffer and the transmission part. The calculation result buffer stores a calculated frame. The transmission part judges whether the frame transmission processing for transmitting a response frame will be completed within a response time upon receiving a transmission command. The transmission part transmits the calculated frame stored in the calculation result buffer as a response frame when judging that the frame transmission processing will not be completed within the response time. Thus, even when it is judged that the frame transmission processing will not be completed within the response time, a correct response frame is transmitted within the response time.

DESCRIPTION OF EMBODIMENTS

Embodiment 1

Description of Configuration

Figure 1:
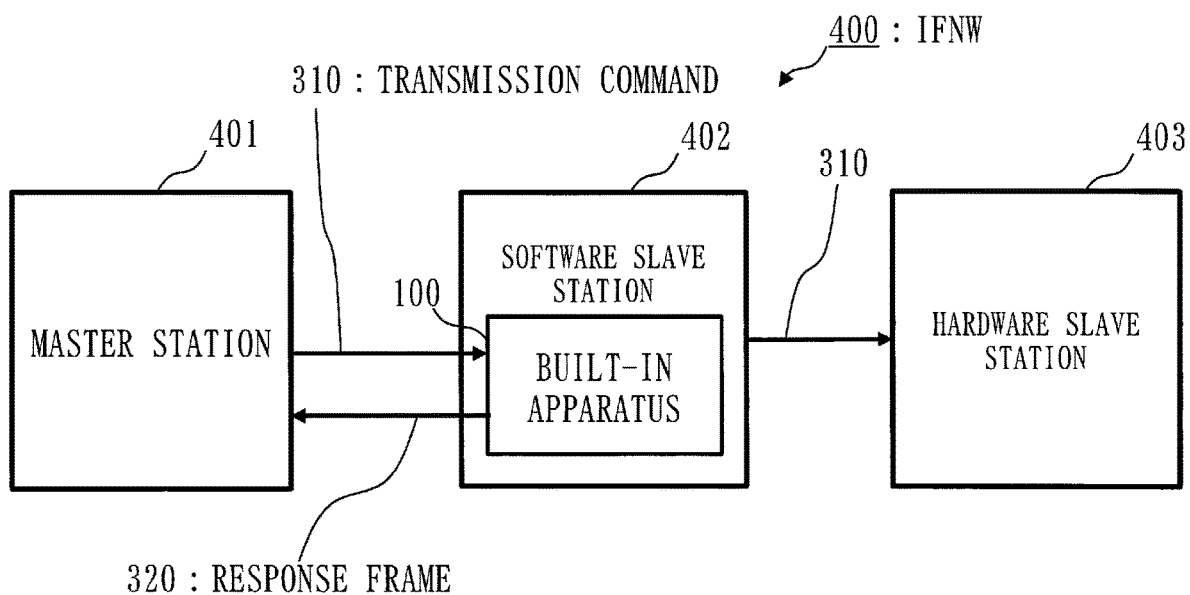
FIG. 1 illustrates an IFNW 400 including a built-in apparatus 100 according to an embodiment 1.

FIG. 1 illustrates an IFNW 400 including a built-in apparatus 100 of the present embodiment.

A master station 401 controls the whole network of the IFNW 400.

A software slave station 402 is equipped with the built-in apparatus 100 of the present embodiment.

A hardware slave station 403 transmits and receives a frame by hardware.

The software slave station 402 receives a transmission command 310 from the master station 401. The transmission command 310 is a token frame that instructs transmission of a response frame 320. Upon receiving the transmission command 310, the built-in apparatus 100 of the software slave station 402 generates the response frame 320, transmits the generated response frame 320 to the master station 401, and transfers the transmission command 310 to other slave station.

The present embodiment describes the built-in apparatus 100 equipped in the software slave station 402 that performs processing for generating the response frame 320 by software. The built-in apparatus 100 of the present embodiment responds within a specific time even when an overhead exists in processing for calculating a frame check sequence.

Figure 2:
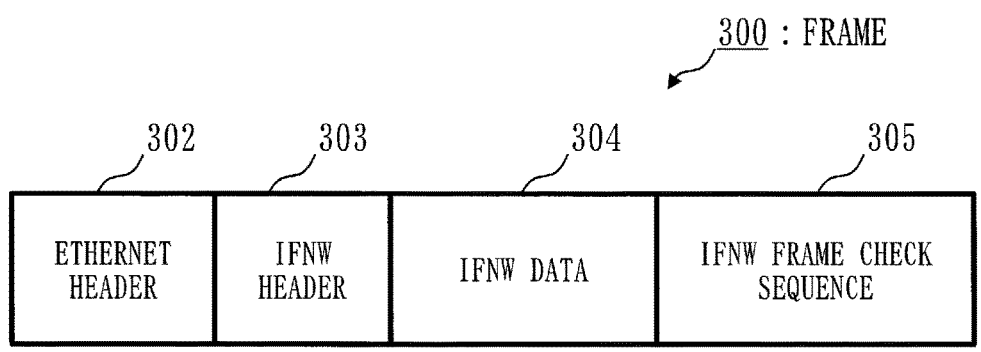
FIG. 2 is a structural diagram of a frame 300 that is transmitted and is received in the IFNW 400 according to the embodiment 1.

FIG. 2 illustrates a structure of a frame 300 that is transmitted and is received in the IFNW 400 of the present embodiment. The response frame 320 and the transmission command 310 are examples of the frame 300.

The frame 300 contains an Ethernet header 302, an IFNW header 303, an IFNW data 304, and an IFNW frame check sequence 305.

The Ethernet header 302 is a field containing a source MAC address, a destination MAC address, and a frame type.

The IFNW header 303 is defined by the IFNW 400. The IFNW header 303 contains information such as a source address and a destination address.

The IFNW data 304 is defined by the IFNW 400. The IFNW data 304 is information such as data showing a condition of an input device.

The IFNW frame check sequence 305 is a field for a frame check sequence that is calculated from the values of the Ethernet header 302, the IFNW header 303, and the IFNW data 304. Typically, CRC-32 is used. In the processing described hereinafter, the phrase "frame check sequence calculation" means calculation of a frame check sequence set in the IFNW frame check sequence 305.

Figure 3:
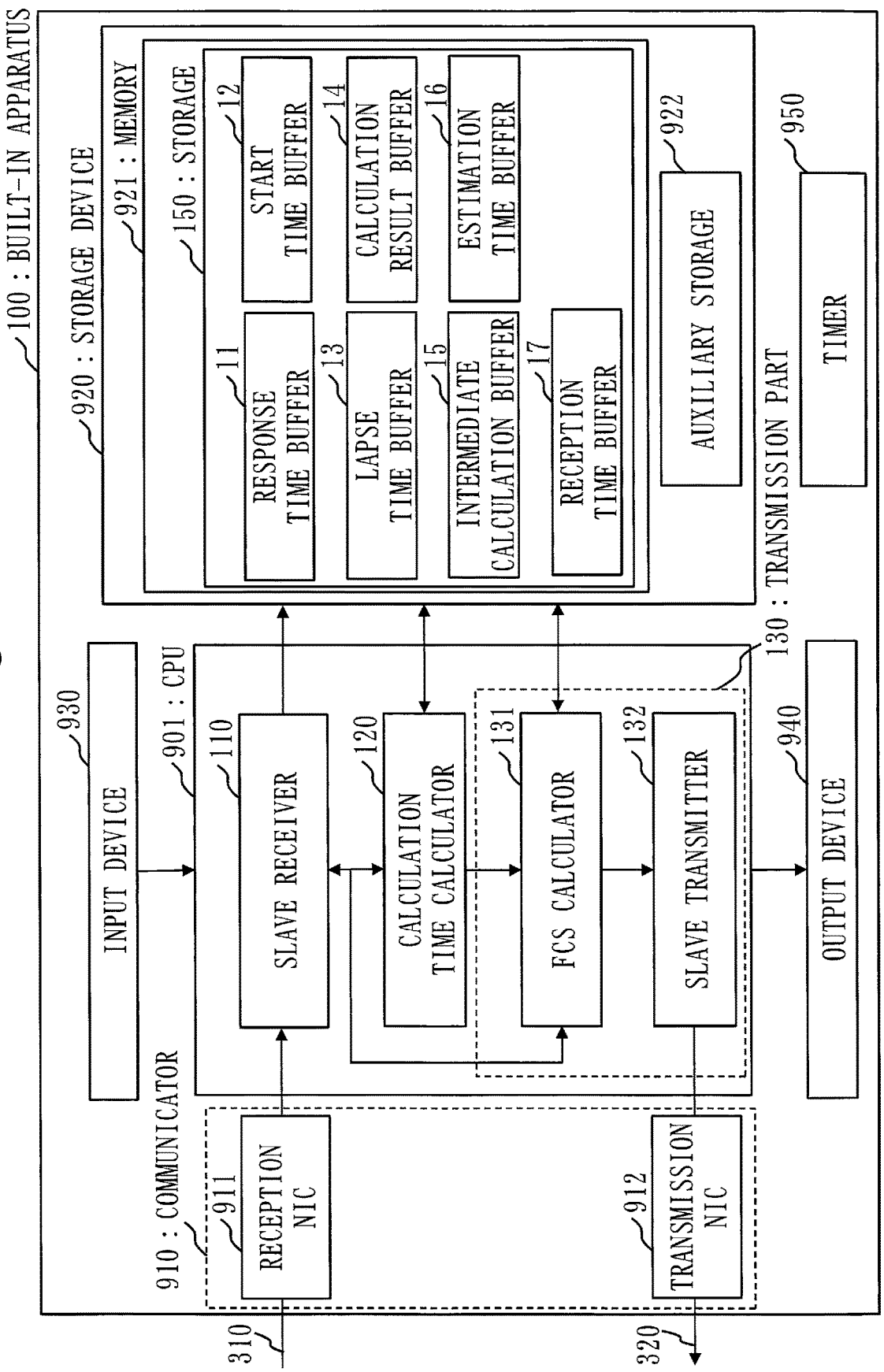
FIG. 3 is a configuration diagram of the built-in apparatus 100 according to the embodiment 1.

The configuration of the built-in apparatus 100 of the present embodiment will be described by referring to FIG. 3.

In the present embodiment, the built-in apparatus 100 is a computer. The built-in apparatus 100 includes hardware components such as a central processing unit (CPU) 901, a communicator 910, a storage device 920, an input device 930, an output device 940, and a timer 950. The storage device 920 includes a memory 921 and an auxiliary storage 922.

Moreover, the built-in apparatus 100 also includes a slave receiver 110, a calculation time calculator 120, a transmission part 130, and a storage 150 as functional components. The transmission part 130 has an FCS calculator 131 and a slave transmitter 132. The following describes the functions of the slave receiver 110, the calculation time calculator 120, and the transmission part 130 of the built-in apparatus 100, as the functions of a "section" of the built-in apparatus 100. The function of the transmission part 130 is provided by the functions of the FCS calculator 131 and the slave transmitter 132. The functions of the "section" of the built-in apparatus 100 are implemented by software.

The storage 150 is implemented by the memory 921. The storage 150 includes a response time buffer 11, a start time buffer 12, a lapse time buffer 13, a calculation result buffer 14, an intermediate calculation buffer 15, an estimation time buffer 16, and a reception time buffer 17.

The CPU 901 is connected to other hardware components via signal lines to control these other hardware components.

The CPU 901 is an integrated circuit (IC) that performs processing. The CPU 901 is a processor.

The auxiliary storage 922 is, specifically, a read only memory (ROM), a flash memory, or a hard disk drive (HDD). The memory 921 is, specifically, a random access memory (RAM). The storage 150 is implemented by the memory 921, but may be implemented by both of the auxiliary storage 922 and the memory 921.

The communicator 910 is, specifically, a network interface card (NIC). The communicator 910 includes a reception NIC 911 and a transmission NIC 912. The reception NIC 911 receives a frame from an upper station and notifies the reception to the CPU 901. The transmission NIC 912 transmits a frame to a lower station upon instruction from the CPU 901. The reception NIC 911 is a receiver, and the transmission NIC 912 is a transmitter.

The input device 930 notifies an input state to the CPU 901 in accordance with input from a user, sensor information in a line of a factory, or other information. The output device 940 notifies a user by means of a LED display or by other means or changes the condition of the line in the factory, as instructed by the CPU 901.

The timer 950 is used for acquiring a lapse time of processing.

The auxiliary storage 922 stores a program for implementing the functions of the "section". The program for implementing the functions of the "section" is also called a "communication program 520". This program is loaded by the memory 921, and the loaded program is read and executed by the CPU 901.

Information showing results of the processing performed by the "section", data, signal values, and variable values are stored in a register or a cache memory in the auxiliary storage 922, the memory 921, or the CPU 901.

The program for implementing the functions of the "section" may be stored in a potable recording medium, such as a magnetic disk, a flexible disk, an optical disc, a compact disc, a blue-ray (registered trademark) disc, or a digital versatile disc (DVD).

Note that what is called a "communication program product" is a storage medium and a storage, which store the program for implementing the functions of the "section", and loads a computer readable program regardless of the appearance type.

Description of Operation

The slave receiver 110 performs slave reception processing to store data that are received from the reception NIC 911 in each of the buffers and call necessary processing.

The calculation time calculator 120 performs calculation-time calculation processing to estimate an approximate processing time that is required for the built-in apparatus 100 to calculate processing time of the frame check sequence at initialization of the network.

The FCS calculator 131 performs FCS calculation processing to calculate a frame check sequence from a transmission frame.

The slave transmitter 132 performs slave transmission processing to notify transmission data to the transmission NIC 912.

The response time buffer 11 holds a response time Tm that is notified from the master station 401 at the start of the network. The response time Tm is a time from when the slave station receives the transmission command 310 for transmitting the response frame 320 until when the slave station completes the transmission of the response frame 320.

The start time buffer 12 holds a start time ts that is acquired from the timer 950 when the FCS calculator 131 for calculating a frame check sequence starts the frame check sequence calculation processing.

The lapse time buffer 13 holds a lapse time Tk from the start time ts until a current time tk of the frame check sequence calculation processing. The start time ts is held by the start time buffer 12.

The calculation result buffer 14 holds a calculated frame 141 containing the frame check sequence that is calculated by the FCS calculator 131.

The intermediate calculation buffer 15 holds frame information used in the frame check sequence calculation processing performed by the FCS calculator 131. The frame information includes only the headers and the data and does not include a frame check sequence.

The estimation time buffer 16 stores a calculation time Tf representing the processing time of the frame check sequence calculation processing, which is calculated by the calculation time calculator 120. The calculation time Tf is also understood as an estimated processing time of the frame check sequence calculation processing, which is estimated by the calculation time calculator 120.

The reception time buffer 17 holds a reception time t0 that is acquired from the timer 950 when the slave receiver 110 receives the transmission command 310 of the token frame.

[Communication Processing S100]

Figure 4:
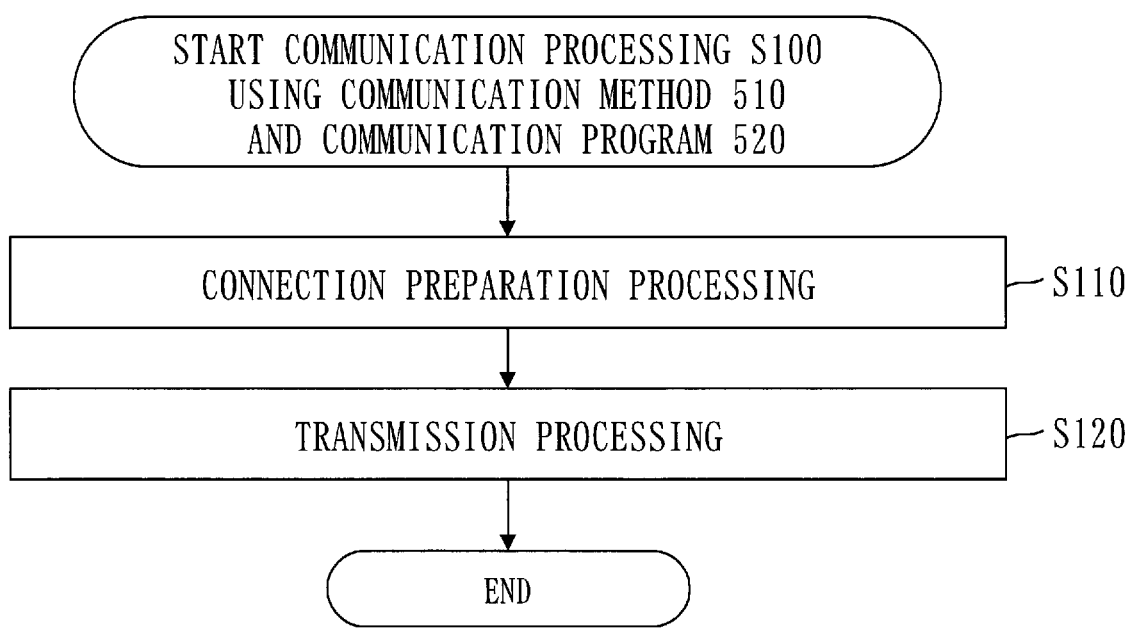
FIG. 4 is a flowchart of communication processing S100 performed in accordance with a communication method 510 and a communication program 520 by the built-in apparatus 100 according to the embodiment 1.

Communication processing S100 that is performed in accordance with a communication method 510 and a communication program 520 by the built-in apparatus 100 of the present embodiment will be described by referring to FIG. 4.

The communication processing S100 includes connection preparation processing S110 and transmission processing S120 that is performed upon receiving the transmission command 310. The transmission processing S120 is also called "token reception-triggered processing".

[Connection Preparation Processing S110]

The connection preparation processing S110 of the built-in apparatus 100 of the present embodiment will be described by referring to FIG. 5.

In step S111, the slave receiver 110 stores the response time Tm, which is received from the master station 401, in the response time buffer 11. That is, the response time buffer 11 stores the response time Tm from when the transmission command 310 for transmitting the response frame 320 is received until when the transmission of the response frame 320 is completed.

In step S112, the slave receiver 110 calls the calculation time calculator 120.

In step S113, the calculation time calculator 120 estimates the processing time of the frame check sequence calculation processing and stores the result in the estimation time buffer 16 as a calculation time Tf That is, the calculation time calculator 120 calculates the calculation time Tf required for the frame check sequence calculation. The calculation time calculator 120 returns the processing to the slave receiver 110.

In step S114, the slave receiver 110 calls the FCS calculator 131.

In step S115, the FCS calculator 131 acquires first data that shows an initial condition, from the input device 930, calculates a frame check sequence of the first data, and stores the result in the calculation result buffer 14. The first data, which is acquired from the input device 930, shows a condition of the device. Here, the first data is acquired from the input device 930 in the initial condition and shows the condition of the device. The first data contains data itself that is acquired from the input device 930 and also contains headers. The calculation result buffer 14 stores the first data and the frame check sequence, which is calculated from the first data, as a calculated frame 141.

[Transmission Processing S120]

Figure 6:
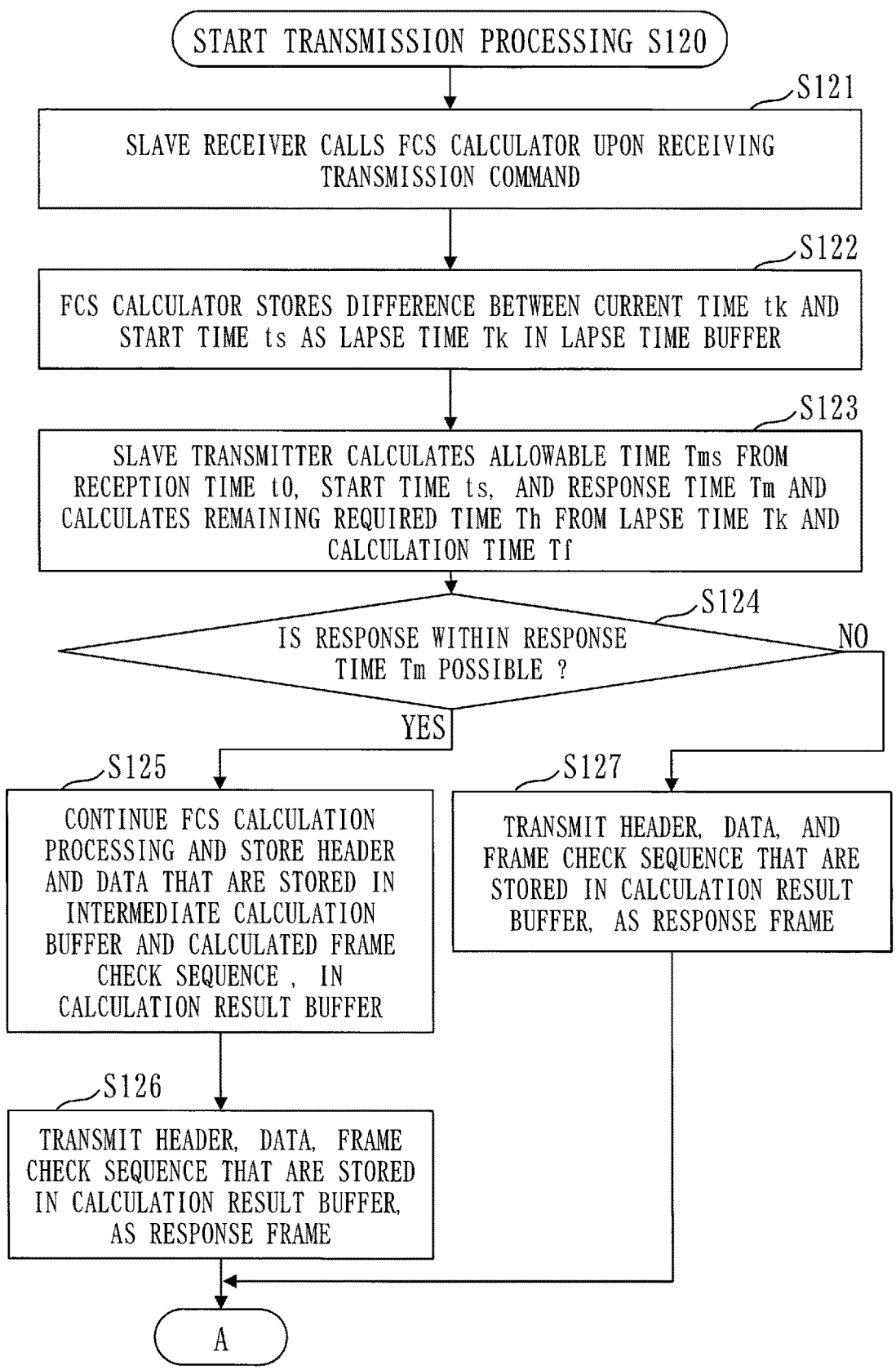
FIG. 6 is a flowchart of transmission processing S120 performed by the built-in apparatus 100 according to the embodiment 1.

The transmission processing S120 of the built-in apparatus 100 of this embodiment will be described by referring to FIG. 6. First, an outline of the transmission processing S120 is described.

In the transmission processing S120, upon receiving the transmission command 310, the transmission part 130 acquires second data and starts the processing of calculating a frame check sequence from the second data. The second data is acquired from the input device 930 in the current condition and shows the condition of the device. The second data contains data itself that is acquired from the input device 930 and also contains headers.

Moreover, the transmission part 130 judges whether the frame transmission processing will be completed within the response time Tm in addition to starting the processing of calculating the frame check sequence from the second data. The frame transmission processing causes the second data and the frame check sequence, which is calculated from the second data, to be generated and be transmitted as a response frame 320.

When judging that the frame transmission processing will not be completed within the response time Tm, the transmission part 130 transmits the calculated frame 141, which is stored in the calculation result buffer 14, as the response frame 320.

When judging that the frame transmission processing will be completed within the response time Tm, the transmission part 130 transmits the second data and the frame check sequence calculated from the second data as the response frame 320 and overwrites the calculated frame 141 stored in the calculation result buffer 14 with the response frame 320.

Next, the transmission processing S120 will be specifically described.

In step S121, the slave receiver 110 receives the transmission command 310 contained in the token frame via the reception NIC 911. Upon receiving the transmission command 310, the slave receiver 110 calls the FCS calculator 131. The FCS calculator 131 stores the second data in the intermediate calculation buffer 15 as frame information and starts the frame check sequence calculation processing for the second data. Moreover, the FCS calculator 131 stores the start time ts for starting the frame check sequence calculation processing for the second data in the start time buffer 12.

In step S122, the FCS calculator 131 stores a difference between the current time tk, which is acquired from the timer 950, and the start time ts, which is held in the start time buffer 12, in the lapse time buffer 13 as a lapse time Tk. The FCS calculator 131 calls the slave transmitter 132.

The slave transmitter 132 judges whether the transmission of the response frame 320 will be completed within the response time Tm, by using the calculation time Tf.

The processing to judge whether the slave transmitter 132 will complete the frame transmission processing within the response time Tm in steps S123 and S124, is described as follows by referring to FIG. 7. The completion of the frame transmission processing within the response time Tm means that the frame transmission processing is finished within the response time Tm. The incompletion of the frame transmission processing within the response time Tm means that the frame transmission processing is unfinished within the response time Tm.

In step S123, the slave transmitter 132 calculates a difference between the lapse time Tk, which is stored in the lapse time buffer 13, and the calculation time Tf, which is stored in the estimation time buffer 16, as a remaining required time Th. Moreover, the slave transmitter 132 subtracts a post-reception time T0 from the reception time t0 to the start time is and the lapse time Tk from the response time Tm, and the slave transmitter 132 uses the calculation result as an allowable time Tms. The slave transmitter 132 judges whether the frame transmission processing will be completed within the response time Tm, on the basis of the remaining required time Th and the allowable time Tms. That is, the slave transmitter 132 judges whether the frame response will be completed within the response time Tm, on the basis of the remaining required time Th and the allowable time Tms.

Specifically, the slave transmitter 132 compares the allowable time Tms and the remaining required time Th with each other. When the remaining required time Th is equal to or less than the allowable time Tms, the slave transmitter 132 judges that the frame response will be completed within the response time Tm.

In a case in which the frame response will be completed within the response time Tm, that is, when the judgment is YES in step S124, the processing advances to step S125.

In a case in which the frame response will not be completed within the response time Tm, that is, when the judgment is NO in step S124, the processing advances to step S127.

In step S125, the slave transmitter 132 calls the FCS calculator 131 to continue the frame check sequence calculation processing. After completing the frame check sequence calculation processing, the FCS calculator 131 stores the second data stored in the intermediate calculation buffer 15 and the calculated frame check sequence, in the calculation result buffer 14 as the calculated frame 141. The FCS calculator 131 returns the processing to the slave transmitter 132.

In step S126, the slave transmitter 132 transmits the calculated frame 141 stored in the calculation result buffer 14. That is, the slave transmitter 132 adds the calculated frame check sequence to the second data stored in the calculation result buffer 14 and transmits this data to the transmission NIC 912 as the response frame 320. Thereafter, the processing advances to post-transmission stationary processing S130.

In step S127, the slave transmitter 132 transmits the calculated frame 141 stored in the calculation result buffer 14, as the response frame 320. This calculated frame 141 may be the calculated frame 141 that was stored in the calculation result buffer 14 in the connection preparation processing S110 or may be the response frame 320 that was transmitted at the last time. That is, the slave transmitter 132 adds the frame check sequence stored in the calculation result buffer 14 to the headers and the data stored in the calculation result buffer 14, and the slave transmitter 132 transmits this data as the response frame 320. Thereafter, the processing advances to the post-transmission stationary processing S130.

[Post-Transmission Stationary Processing S130]

Figure 8:
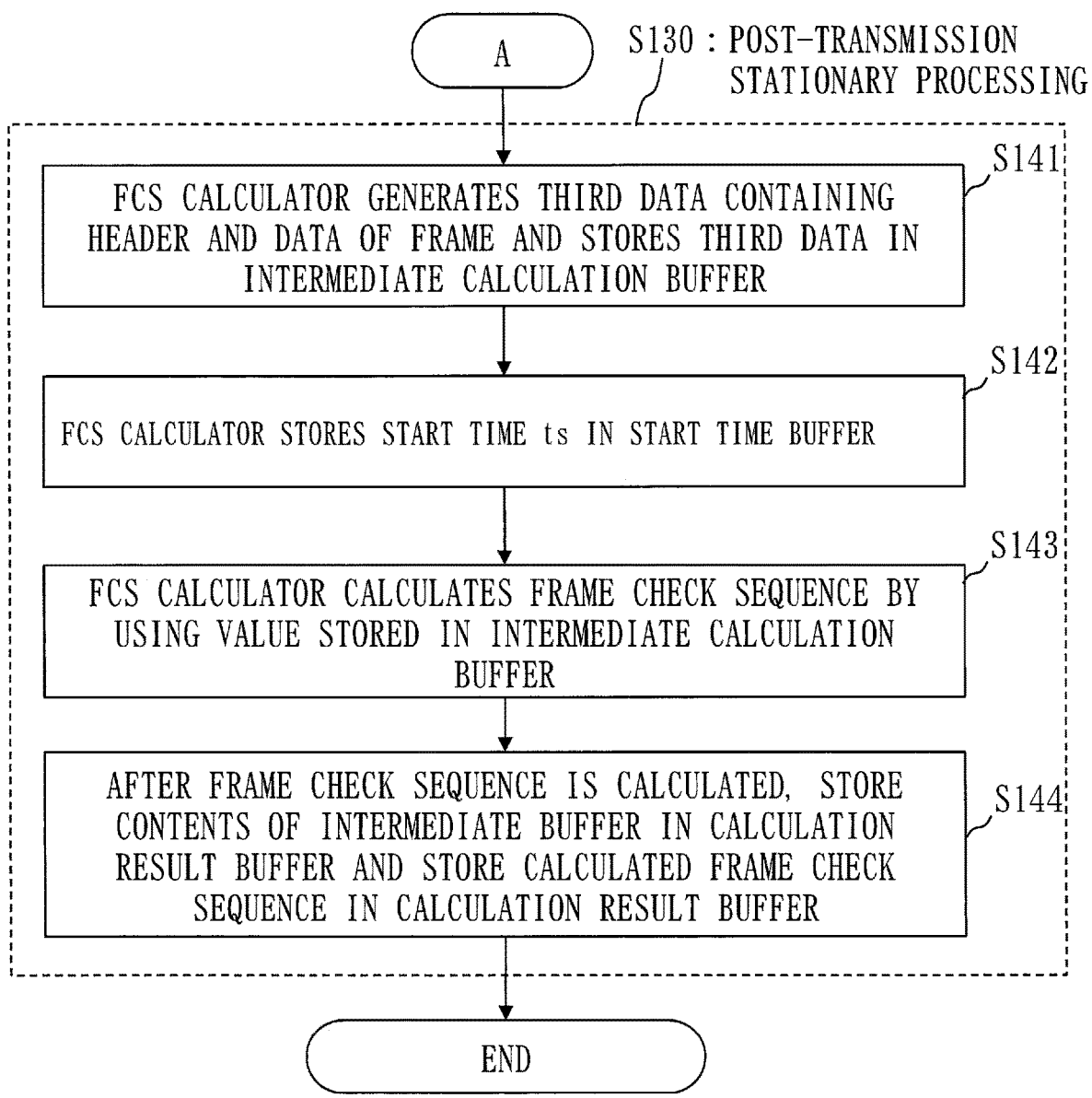
FIG. 8 is a flowchart of post-transmission stationary processing S130 performed by the built-in apparatus 100 according to the embodiment 1.

The post-transmission stationary processing S130 of the built-in apparatus 100 of the present embodiment will be described by referring to FIG. 8. First, an outline of the post-transmission stationary processing S130 is described.

After completing the transmission of the response frame 320, the transmission part 130 calculates a frame check sequence from third data and overwrites the calculated frame 141 stored in the calculation result buffer 14 with the third data and the frame check sequence calculated from the third data. The third data is acquired from the input device 930 at the start of the post-transmission stationary processing S130 and shows a condition of the device. The third data contains data itself that is acquired from the input device 930 and also contains headers.

Next, the post-transmission stationary processing S130 will be specifically described.

In step S141, the FCS calculator 131 stores the third data in the intermediate calculation buffer 15. The third data contains headers (the Ethernet header 302 and the IFNW header 303) of a frame generated from destination information and contains data (the IFNW data 304) of a frame acquired from the input device 930.

In step S142, the FCS calculator 131 stores the start time is for starting the frame check sequence calculation processing from the timer 950, in the start time buffer 12.

In step S143, the FCS calculator 131 executes the frame check sequence calculation processing by using the third data stored in the intermediate calculation buffer 15.

In step S144, after completing the frame check sequence calculation, the FCS calculator 131 stores the headers and the data in the intermediate calculation buffer 15, that is, stores the third data in the calculation result buffer 14. Moreover, the FCS calculator 131 also stores the calculated frame check sequence in the calculation result buffer 14. That is, the FCS calculator 131 stores the third data and the frame check sequence calculated from the third data, in the calculation result buffer 14 as the calculated frame 141.

Other Configuration

The present embodiment describes a case in which the frame check sequence calculation processing may incur an overhead. However, the present embodiment can also be applied in a case in which processing other than the frame check sequence calculation processing incurs an overhead. In this case, the present embodiment is applied such that the built-in apparatus estimates the processing time of the processing that may incur an overhead and executes the transmission processing as in the case of the present embodiment. A specific example of the case in which the processing other than the frame check sequence calculation processing incurs an overhead includes a case in which the acquisition processing of the input device is slow. In the present embodiment, a calculated frame such as the last value is transmitted in a case in which the processing will not be completed within the response time. However, alternatively, a correct frame satisfying a protocol specification may be transmitted depending on the specification of the network protocol. A specific example of a correct frame satisfying a protocol specification includes a NULL frame that represents an invalid frame.

Additionally, although the functions of the built-in apparatus 100 are implemented by software in the present embodiment, the functions of the built-in apparatus 100 may be mounted on hardware in a modified example.

A configuration of the built-in apparatus 100 of a modified example of the present embodiment will be described by referring to FIG. 9.

Figure 9:
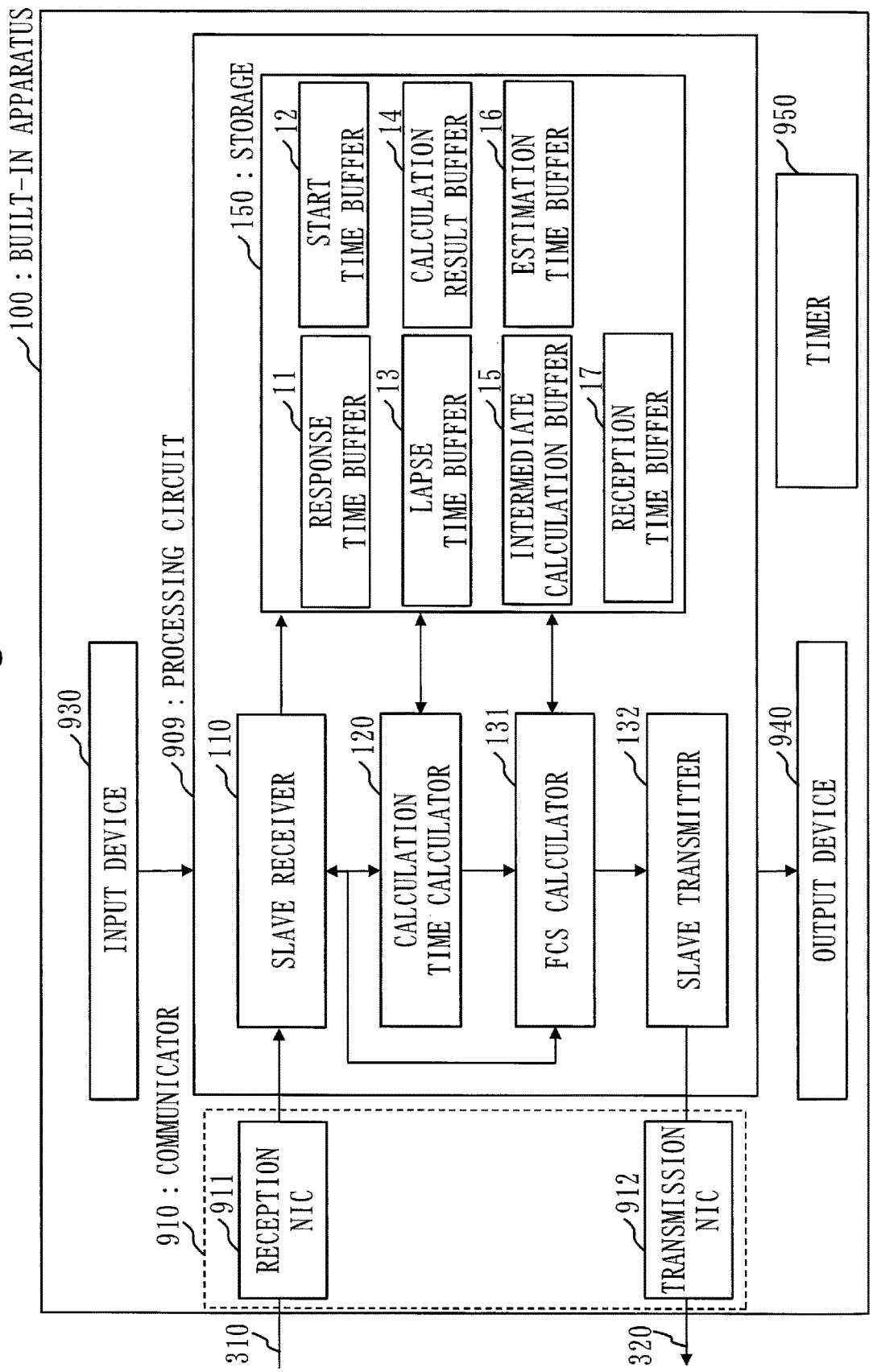
FIG. 9 is a configuration diagram of the built-in apparatus 100 according to a modified example of the embodiment 1.

Referring to FIG. 9, the built-in apparatus 100 includes hardware components such as a processing circuit 909, a communicator 910, the input device 930, and the output device 940.

The processing circuit 909 is a dedicated electronic circuit that implements the functions of the "section" and the storage 150 described above. The processing circuit 909 is, specifically, a single circuit, a complex circuit, a programmed processor, a parallel programmed processor, a logic IC, a gate array (GA), an application specific integrated circuit (ASIC), or a field programmable gate array (FPGA).

The functions of the "section" may be implemented by the processing circuit 909 or may be distributed and be implemented by multiple processing circuits 909.

In another modified example, the functions of the built-in apparatus 100 may be implemented by a combination of software and hardware. That is, some of the functions of the built-in apparatus 100 may be implemented by hardware, whereas the rest of the functions may be implemented by software.

The CPU 901, the storage device 920, and the processing circuit 909 are collectively called a "processing circuitry". That is, the functions of the "section" are implemented by a processing circuitry in each of the configurations of the built-in apparatus 100 as illustrated in FIGS. 3 and 9.

The "section" may also be understood as a "process", a "procedure", or a "processing". In addition, the functions of the "section" may be implemented by firmware.

Figure 7:
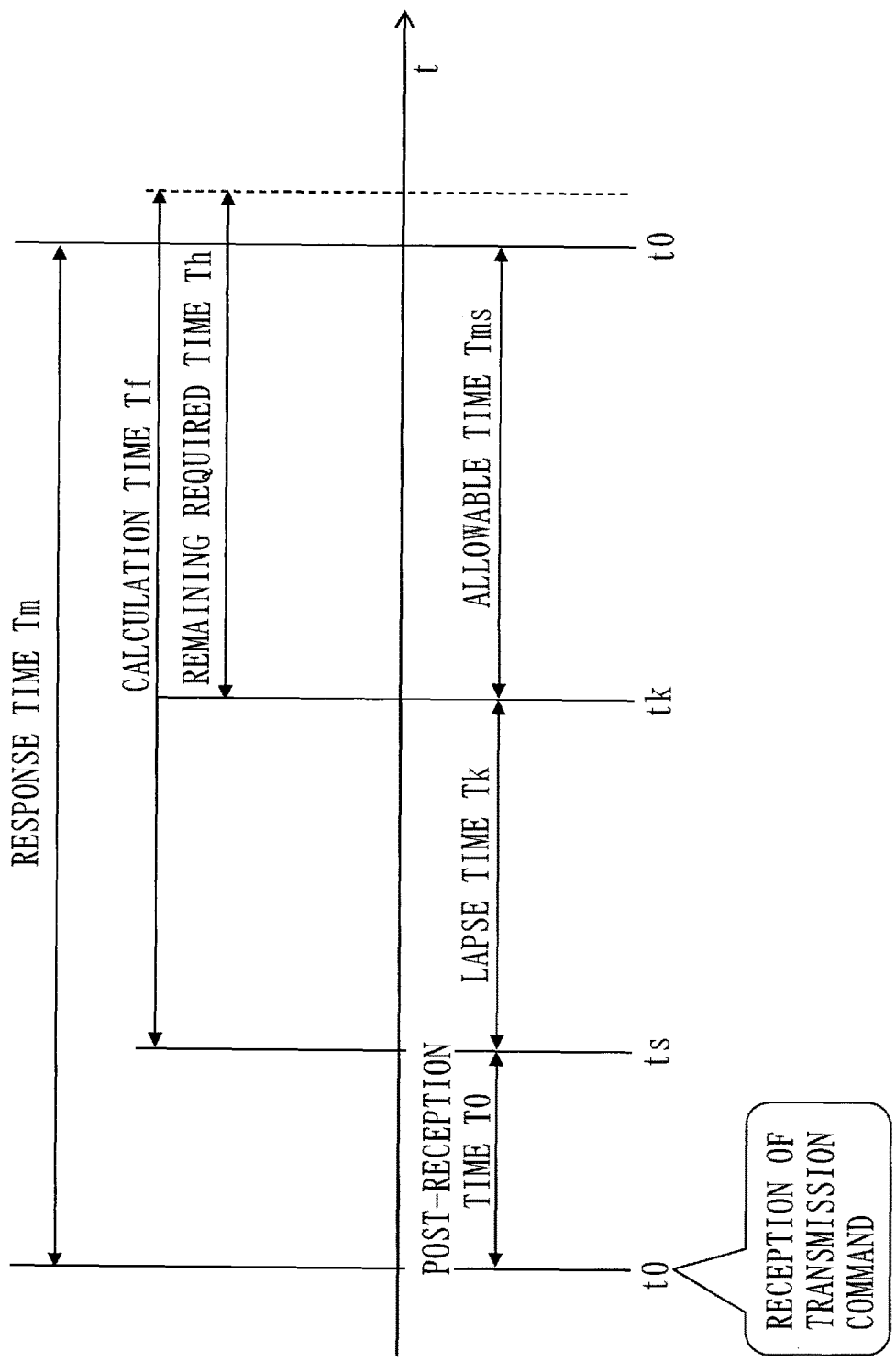
FIG. 7 illustrates processing performed by a slave transmitter 132 according to the embodiment 1 to judge whether frame transmission processing will be completed within a response time Tm.

In the present embodiment, referring to FIG. 7, the slave transmitter judges whether the frame response will be completed within the response time Tm, on the basis of the remaining required time Th in the frame check sequence calculation processing and the allowable time Tms liming the response time Tm. That is, if the frame check sequence calculation processing will be completed within the response time Tm, it is judged that the frame response will be completed within the response time Tm.

However, whether the frame response will be completed may be judged by taking into consideration a required transmission time Ta after completion of the frame check sequence calculation processing and before transmission of a response frame. That is, referring to FIG. 10, the slave transmitter may compare a required time Ty, the sum of the remaining required time Th and the required transmission time Ta, and the allowable time Tms with each other to judge whether the frame response will be completed within the response time Tm. Such a judging method enables more precise judgment.

Description of Effects of the Present Embodiment

As described above, the built-in apparatus 100 of the present embodiment transmits a correct frame within a specific time even when the frame check sequence calculation processing will not be completed within a specified response time in transmission of a response frame by the software slave station. Thus, the built-in apparatus 100 maintains the responsiveness of the entirety of the network without affecting the periodicity of other hardware slave station.

Embodiment 2

As for the present embodiment, differences between the present embodiment and the embodiment 1 are mainly described.

In the embodiment 1, the built-in apparatus 100 judges whether the frame transmission processing will be completed within the response time Tm upon each reception of the transmission command 310. In this case, a user cannot know the degree of delay until the software slave station transmits the response frame 320. In view of this, in the present embodiment, a built-in apparatus 100a will be described. The built-in apparatus 100a notifies a user of the degree of delay until the software slave station transmits the response frame 320, at the stage when the response time Tm is set.

Description of Configuration

Figure 11:
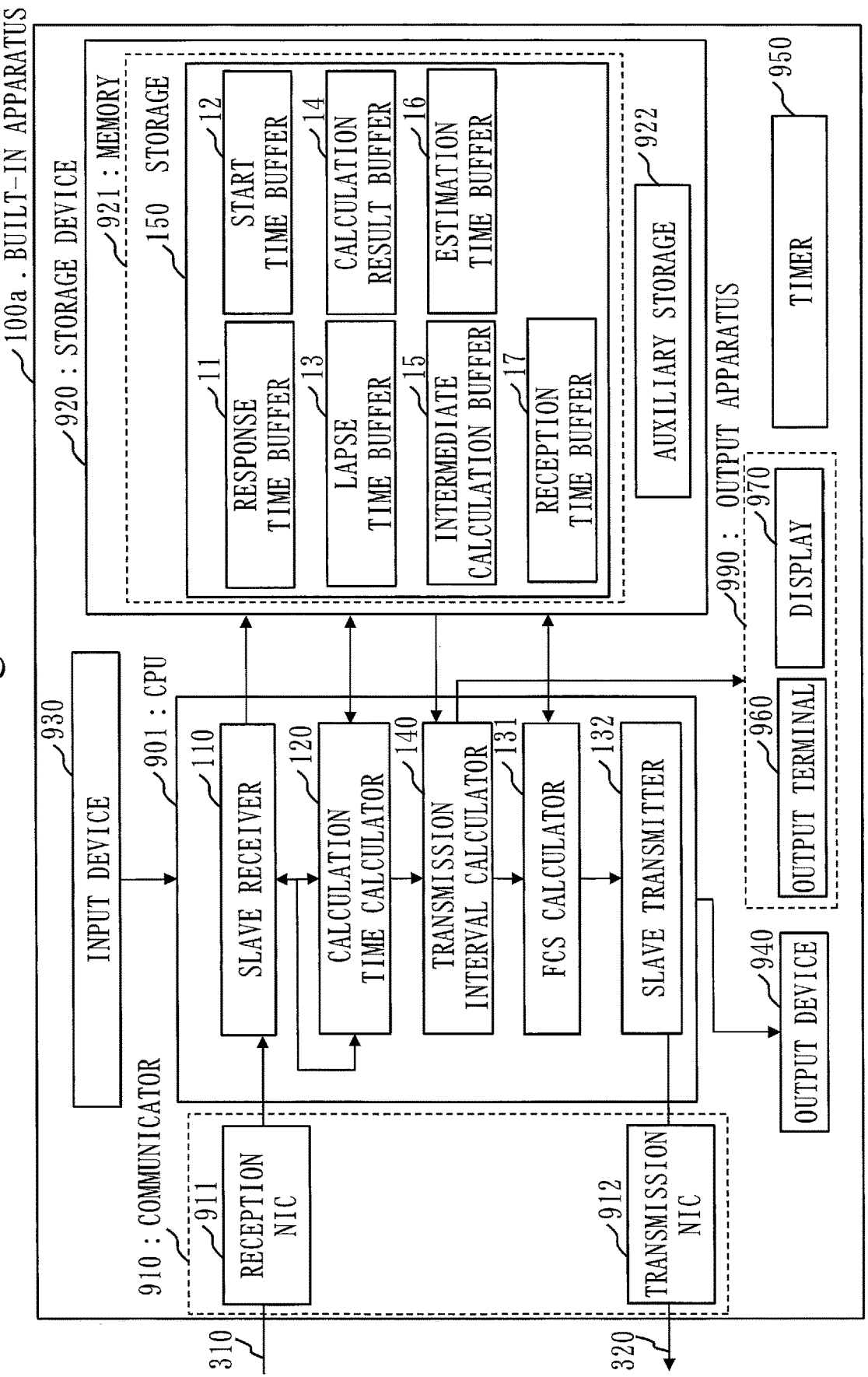
FIG. 11 is a configuration diagram of a built-in apparatus 100a according to an embodiment 2.

The configuration of the built-in apparatus 100a of the present embodiment will be described by referring to FIG. 11.

In the present embodiment, constitutional parts having the same functions as those of the embodiment 1 are marked with the same reference signs and may not be described repeatedly.

The built-in apparatus 100a includes an output apparatus 990 in addition to the hardware configuration of the built-in apparatus 100 described in the embodiment 1. The output apparatus 990 includes an output terminal 960 and a display 970.

The output terminal 960 notifies an internal condition of the software slave station 402 to the outside. The internal condition includes a transmission interval I that represents the degree of delay until the software slave station transmits the response frame 320.

The display 970 displays the internal condition of the software slave station 402.

Moreover, the built-in apparatus 100a also includes a transmission interval calculator 140 in addition to the functional configuration of the built-in apparatus 100 described in the embodiment 1. That is, in the present embodiment, the function of the transmission interval calculator 140 is added to the functions of the "section" of the built-in apparatus 100a.

Description of Operation

Figure 12:
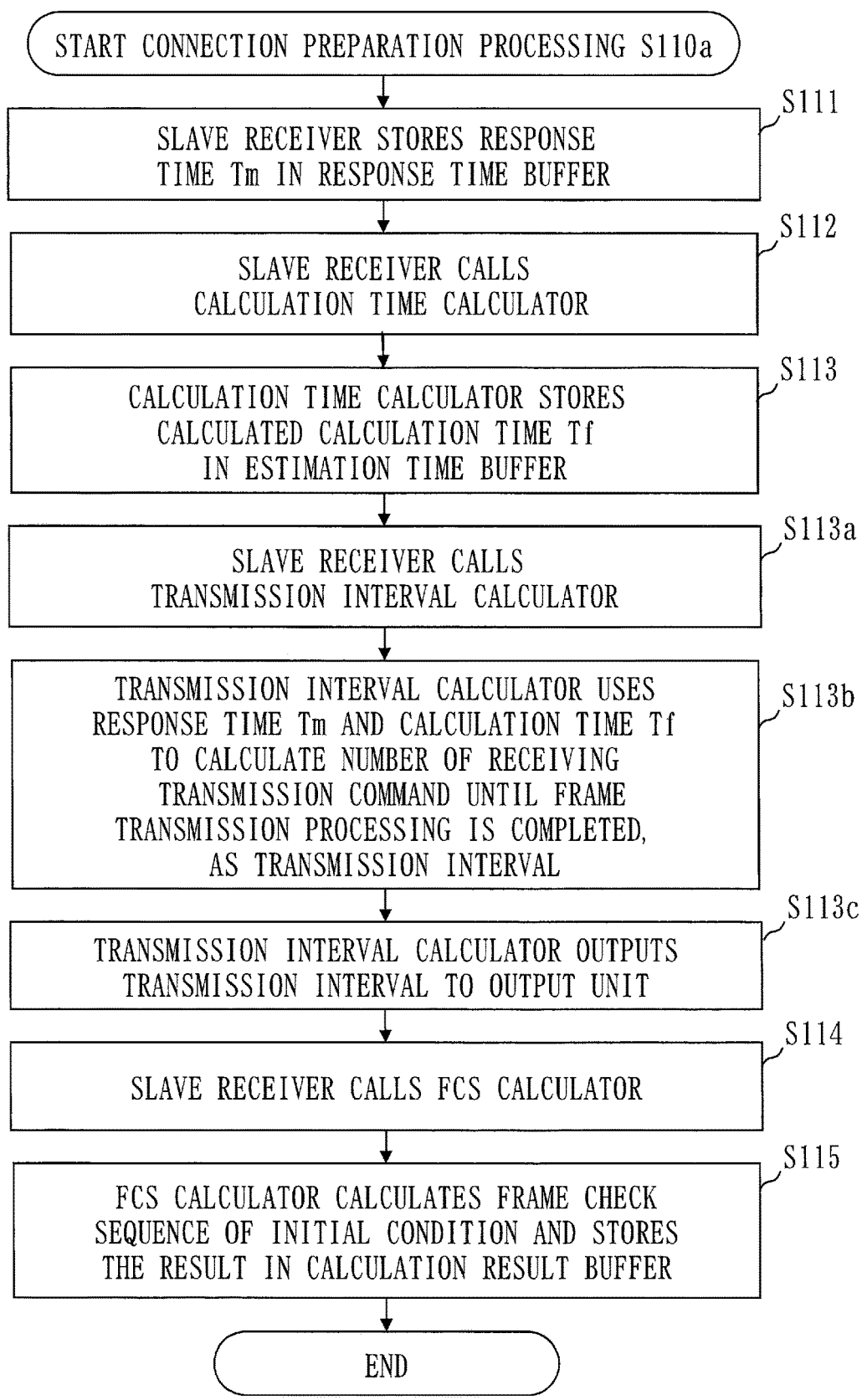
FIG. 12 is a flowchart of connection preparation processing S110a according to the embodiment 2.

The connection preparation processing S110a of the present embodiment will be described by referring to FIG. 12.

The connection preparation processing S110a includes steps S113a to S113c that are performed by the transmission interval calculator 140 between the steps S113 and S114, in addition to the connection preparation processing S110 described in the embodiment 1.

The transmission interval calculator 140 estimates the degree of period until the built-in apparatus 100a takes in data from the input device 930, from the calculation time Tf stored in the estimation time buffer 16 and the response time Tm stored in the response time buffer 11. That is, the transmission interval calculator 140 calculates the number of receiving the transmission command 310 until the frame transmission processing is completed, as the transmission interval I, by using the response time Tm and the calculation time Tf.

Hereinafter, the connection preparation processing S110a will be described in detail.

Figure 5:
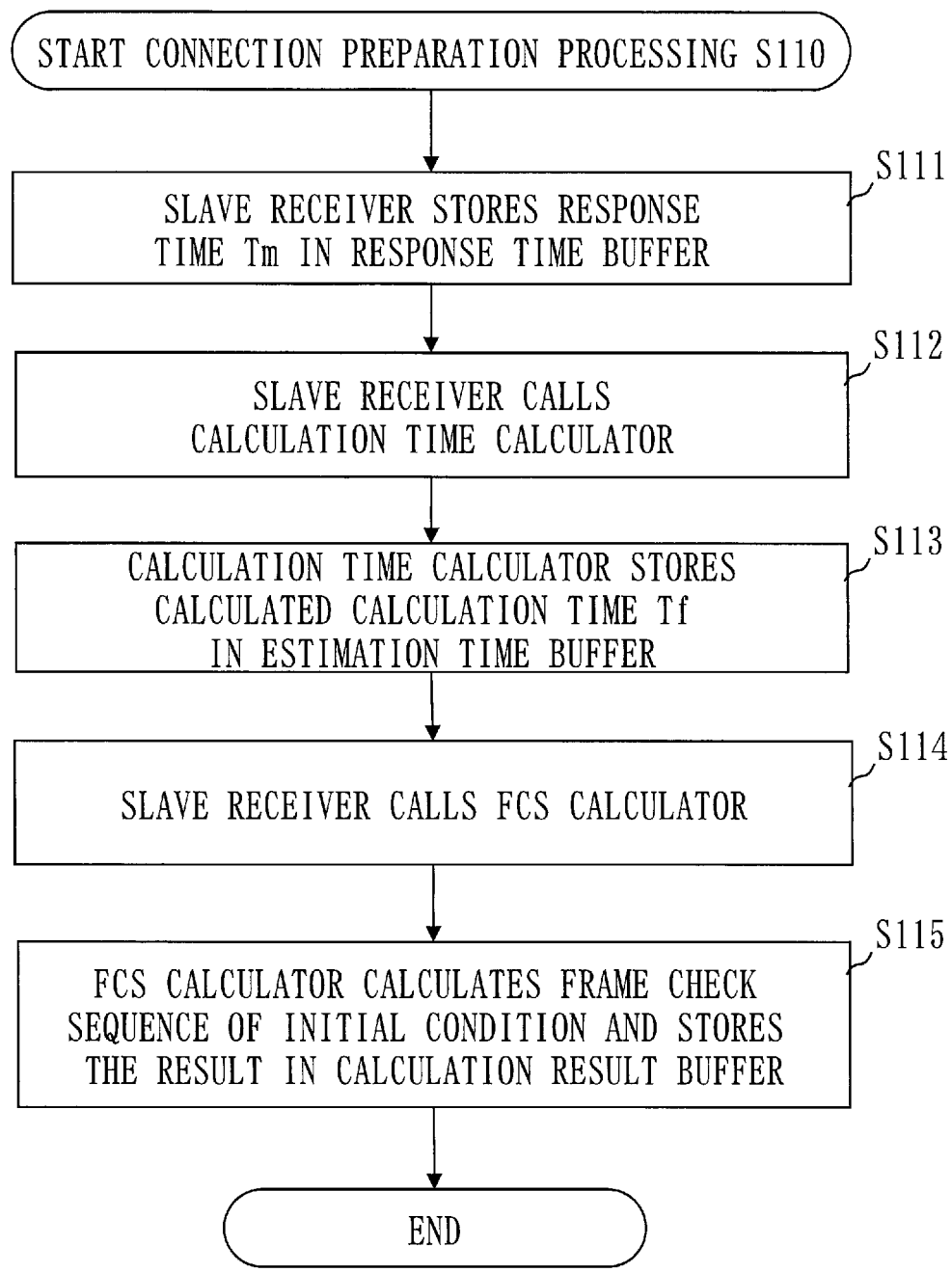
FIG. 5 is a flowchart of connection preparation processing S110 performed by the built-in apparatus 100 according to the embodiment 1.

The processing from step S111 to step S113 is similar to that from step S111 to step S113 in FIG. 5 in the embodiment 1.

In step S113a, the slave receiver 110 calls the transmission interval calculator 140.

Figure 10:
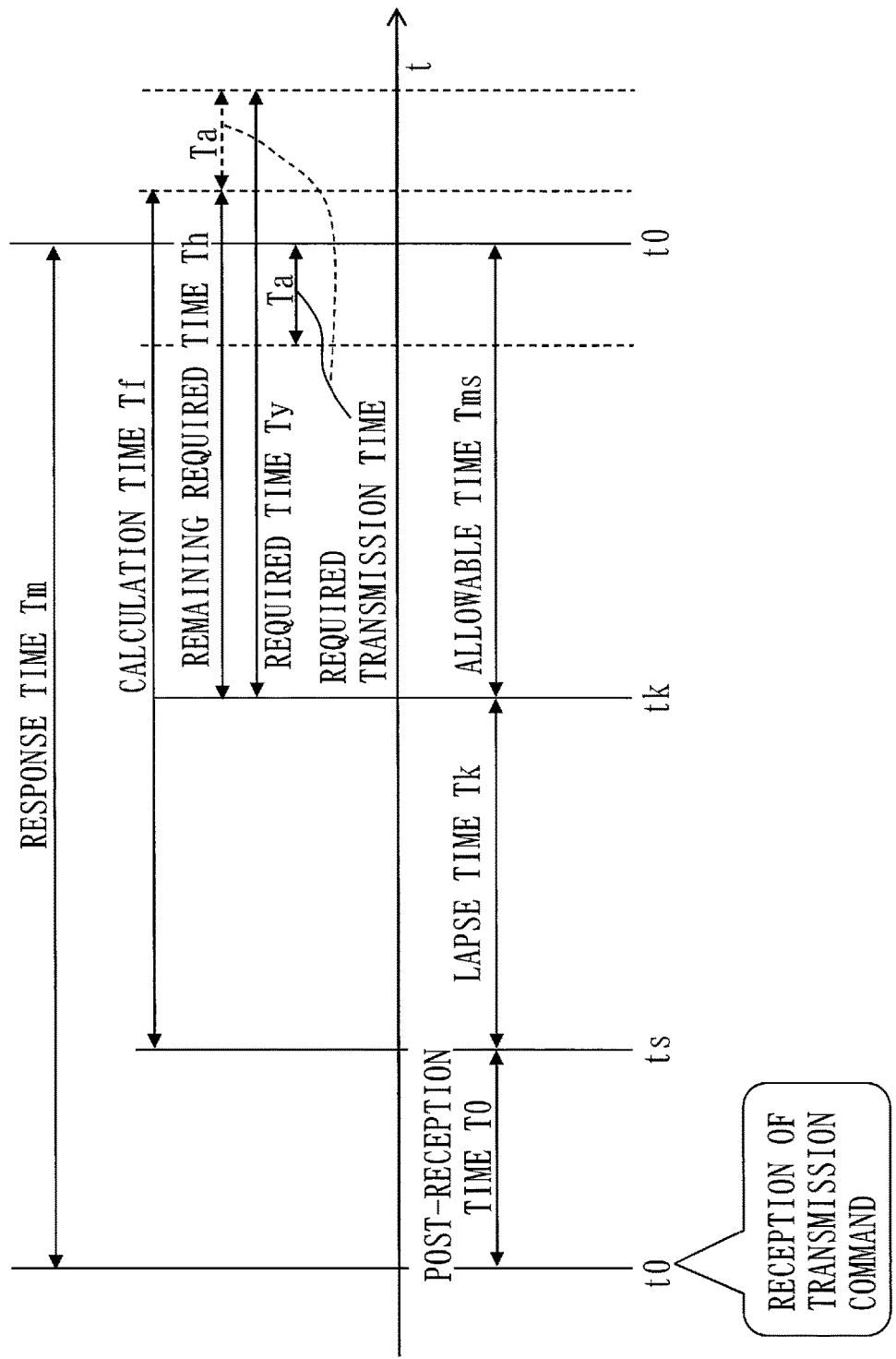
FIG. 10 illustrates a modified example of the processing performed by the slave transmitter 132 according to the embodiment 1 to judge whether the frame transmission processing will be completed within the response time Tm.

In step S113b, the transmission interval calculator 140 acquires the calculation time Tf, the response time Tm, and a transmission processing time Tt that is a time for the frame transmission processing except for the frame check sequence calculation processing. Specifically, the transmission interval calculator 140 acquires a post-reception time T0 and a required transmission time Ta as illustrated in FIG. 10, as the transmission processing time Tt. The transmission interval calculator 140 uses the calculation time Tf, the response time Tm, and the transmission processing time Tt to calculate the number of repeating the transmission processing S120 until the frame transmission processing is completed. The frame transmission processing starts when the built-in apparatus 100a receives the transmission command 310 for transmitting the response frame 320 and ends when the built-in apparatus 100a transmits the latest response frame 320. That is, the transmission interval calculator 140 calculates the number of repeating the token reception-triggered processing until the frame transmission processing is completed.

Hereinafter, a specific example will be described.

It is assumed that the response time Tm is 15 seconds, the calculation time Tf of the frame check sequence calculation processing is 10 seconds, and the transmission processing time Tt for the transmission processing except for the frame check sequence calculation processing is 10 seconds. In this case, the sum of the frame check sequence calculation processing and the transmission processing time Tt for the other processing is 20 seconds. Since the response time is 15 seconds, the frame transmission processing is not completed within the response time Tm. Under this condition, the transmission interval calculator 140 judges, in view of the difference between the response time Tm and the transmission processing time Tt and the calculation time Tf, which are 5 and 10 seconds respectively, that the frame transmission processing for transmitting a latest response frame 320 is completed by performing the transmission processing S120 twice. That is, during 15 seconds for the response time Tm, the frame check sequence calculation processing is interrupted after being performed for 5 seconds, and a last frame is transmitted in 10 seconds. Upon receiving the transmission command 310 immediately thereafter, the frame check sequence calculation processing is completed in 5 seconds, and a latest response frame 320 is transmitted this time. That is, the transmission command 310 is received twice until the frame transmission processing is completed to transmit the response frame 320 for transmitting the data of the input device 930. Thus, in this specific example, the data of the input device 930 obtained at the last time is usable. For this structure, the transmission interval calculator 140 calculates the transmission interval I and outputs a value "2".

In step S113c, the transmission interval calculator 140 outputs the calculated transmission interval I to the output apparatus 990. The output apparatus 990 displays the transmission interval I on the display 970. Moreover, the output apparatus 990 outputs the transmission interval I to an external device connected to the output terminal 960. This enables notification to a user of the acquisition interval of the input device this time.

Description of Effects of the Present Embodiment

As described above, the built-in apparatus 100a of the present embodiment facilitates understanding the system condition during operation of an FA system. Moreover, the transmission interval I can be used as design information in constructing an FA system.

In each of the embodiments 1 and 2 of the invention described above, among the function blocks described as the "section", only any one of the function blocks may be used, or some of the function blocks may be used in any combination. That is, the function blocks of the built-in apparatus are optional as long as the functions described in each of the above embodiments are implemented. The built-in apparatus can be configured by any combination or any configuration of these function blocks. In addition, the built-in apparatus may not be implemented by one device and may be a communication system configured of multiple devices.

In the embodiments 1 and 2 described above, the embodiments 1 and 2 may be practiced partially in combination with each other. Alternatively, one of these two embodiments may be partially practiced. Additionally, among these two embodiments, one of the embodiment may be fully or partially practiced in combination with the entirety or a part of the other embodiment.

Note that the above embodiments are essentially preferable examples and are not intend to limit the scope of the invention and the range of their applications and purposes, and they can variously be modified as necessary.

REFERENCE SIGNS LIST

11: response time buffer, 12: start time buffer, 13: lapse time buffer, 14: calculation result buffer, 15: intermediate calculation buffer, 16: estimation time buffer, 17: reception time buffer, 100, 100a: built-in apparatus, 110: slave receiver, 120: calculation time calculator, 130: transmission part, 131: FCS calculator, 132: slave transmitter, 140: transmission interval calculator, 141: calculated frame, 150: storage, 300: frame, 302: Ethernet header, 303: IFNW header, 304: IFNW data, 305: IFNW frame check sequence, 310: transmission command, 320: response frame, 400: IFNW, 401: master station, 402: software slave station, 403: hardware slave station, 901: CPU, 909: processing circuit, 910: communicator, 911: reception NIC, 912: transmission NIC, 920: storage device, 921: memory, 922: auxiliary storage, 930: input device, 940: output device, 950: timer, 960: output terminal, 970: display, 990: output apparatus, S100: communication processing, S110: connection preparation processing, S120: transmission processing, S130: post-transmission stationary processing, Tm: response time, Tf: calculation time, T0: post-reception time, Tk: lapse time, Tms: allowable time, Th: remaining required time, Ta: required transmission time, Ty: required time.

The invention claimed is:

1. A built-in apparatus comprising:
a response time buffer to store a response time from when a transmission command for transmitting a response frame is received until when the transmission of the response frame is completed;
a calculation result buffer to store first data and a frame check sequence that is calculated from the first data, as a calculated frame; and
processing circuitry to obtain second data and start processing for calculating a frame check sequence from the second data, upon receiving the transmission command, judge whether frame transmission processing for generating and transmitting the second data and the frame check sequence calculated from the second data as the response frame will be completed within the response time, and transmit the calculated frame stored in the calculation result buffer as the response frame when judging that the frame transmission processing will not be completed within the response time.

2. The built-in apparatus according to claim 1,
wherein, when judging that the frame transmission processing will be completed within the response time, the processing circuitry transmits the second data and the frame check sequence calculated from the second data as the response frame and overwrites the calculated frame stored in the calculation result buffer with the response frame.

3. The built-in apparatus according to claim 1,
wherein after completing the transmission of the response frame, the processing circuitry calculates a frame check sequence from third data and overwrites the calculated frame stored in the calculation result buffer with the third data and the frame check sequence calculated from the third data.

4. The built-in apparatus according to claim 1, further comprising:
a calculation time calculator to calculate a calculation time required for calculating a frame check sequence,
wherein the processing circuitry judges whether the transmission of the response frame will be completed within the response time by using the calculation time.

5. The built-in apparatus according to claim 4, further comprising:
a transmission interval calculator to calculate the number of receiving a transmission command until when the frame transmission processing is completed, as a transmission interval by using the response time and the calculation time; and
an output apparatus to output the transmission interval to the outside.

6. A communication method for causing a CPU to:
store a response time from when a transmission command for transmitting a response frame is received until when the transmission of the response frame is completed, in a response time buffer;
store first data and a frame check sequence that is calculated from the first data, as a calculated frame in a calculation result buffer; and
obtain second data and start processing for calculating a frame check sequence from the second data, upon receiving the transmission command, judge whether frame transmission processing for generating and transmitting the second data and the frame check sequence calculated from the second data as the response frame will be completed within the response time, and transmit the calculated frame stored in the calculation result buffer as the response frame when judging that the frame transmission processing will not be completed within the response time.

7. A non-transitory computer readable medium storing a communication program for causing a computer to execute:
connection preparation processing to store a response time from when a transmission command for transmitting a response frame is received until when the transmission of the response frame is completed, in a response time buffer and store first data and a frame check sequence that is calculated from the first data, as a calculated frame in a calculation result buffer; and
transmission processing to obtain second data and start processing for calculating a frame check sequence from the second data, upon receiving the transmission command, judge whether frame transmission processing for generating and transmitting the second data and the frame check sequence calculated from the second data as the response frame will be completed within the response time, and transmit the calculated frame stored in the calculation result buffer as the response frame when judging that the frame transmission processing will not be completed within the response time.

8. The built-in apparatus according to claim 2,
wherein after completing the transmission of the response frame, the processing circuitry calculates a frame check sequence from third data and overwrites the calculated frame stored in the calculation result buffer with the third data and the frame check sequence calculated from the third data.

9. The built-in apparatus according to claim 2, further comprising:
a calculation time calculator to calculate a calculation time required for calculating a frame check sequence,
wherein the processing circuitry judges whether the transmission of the response frame will be completed within the response time by using the calculation time.

10. The built-in apparatus according to claim 3, further comprising:
a calculation time calculator to calculate a calculation time required for calculating a frame check sequence,
wherein the processing circuitry judges whether the transmission of the response frame will be completed within the response time by using the calculation time.

11. The built-in apparatus according to claim 8, further comprising:

a calculation time calculator to calculate a calculation time required for calculating a frame check sequence, wherein the processing circuitry judges whether the transmission of the response frame will be completed within the response time by using the calculation time.

12. The built-in apparatus according to claim 9, further comprising:
a transmission interval calculator to calculate the number of receiving a transmission command until when the frame transmission processing is completed, as a transmission interval by using the response time and the calculation time; and
an output apparatus to output the transmission interval to the outside.

13. The built-in apparatus according to claim 10, further comprising:
a transmission interval calculator to calculate the number of receiving a transmission command until when the frame transmission processing is completed, as a transmission interval by using the response time and the calculation time; and
an output apparatus to output the transmission interval to the outside.

14. The built-in apparatus according to claim 11, further comprising:
a transmission interval calculator to calculate the number of receiving a transmission command until when the frame transmission processing is completed, as a transmission interval by using the response time and the calculation time; and
an output apparatus to output the transmission interval to the outside.

\* \* \* \* \*